United States Patent

[11] 3,575,391

| [72] | Inventors | Paul E. Braun<br>Birmingham;<br>Thomas A. Nelson, Allen Park; Charles K.<br>Weslock, Harper Woods, Mich. |
|---|---|---|
| [21] | Appl. No. | 806,036 |
| [22] | Filed | Mar. 6, 1969 |
| [45] | Patented | Apr. 20, 1971 |
| [73] | Assignee | Ford Motor Company<br>Dearborn, Mich.<br>Continuation of application Ser. No.<br>611,906, Jan. 26, 1967, now abandoned. |

[54] CARBURETOR HAVING A ROTARY DAMPER FOR THE AIR VALVE
2 Claims, 2 Drawing Figs.

[52] U.S. Cl. .................................................. 261/64,
261/23, 74/574
[51] Int. Cl. ................................................ F02m 19/12,
F02m 7/24
[50] Field of Search ........................................... 261/50.1,
23.1, 38, 64; 74/573 (F), 574

[56] References Cited
UNITED STATES PATENTS
| 2,220,524 | 11/1940 | Kapitza ........................ | 74/574 |
| 2,501,060 | 3/1950 | Leibing ........................ | 73/228 |
| 3,040,598 | 6/1962 | Warren ........................ | 74/574 |
| 3,147,320 | 9/1964 | Tubb............................. | 261/51 |
| 3,274,836 | 9/1966 | Nash ............................ | 74/574 |
| 3,284,060 | 11/1966 | Kalert, Jr..................... | 261/23 |

Primary Examiner—Ronald R. Weaver
Attorneys—John R. Faulkner and Glen S. Arendsen ABSTRACT: A rotary damper for the air valve of an air valve carburetor. The damper comprises a rotor attached to one end of the air valve mounting shaft and rotating in a viscous fluid medium that dampens air valve oscillation without affecting normal air valve operation. Lands on the rotor and the rotor housing increase the amount of damping at any given air valve opening. Each of said lands on the rotor and housing has a significant surface area. The air valve rotating the rotor from a position in which the lands are adjacent each other to a position in which the lands are removed from each other. The lands and the fluid medium providing an increased amount of damping when the lands are adjacent each other. The housing is only partially filled with the fluid medium and the land of the rotor is positioned out of the fluid and adjacent the land on the housing for an increased amount of damping.

Patented April 20, 1971

3,575,391

PAUL E. BRAUN
THOMAS A. NELSON
CHARLES K. WESLOCK
INVENTORS

BY John R. Faulkner
Glenn S. Arendsen

ATTORNEYS

CARBURETOR HAVING A ROTARY DAMPER FOR THE AIR VALVE

CROSS REFERENCE TO RELATED APPLICATION

This application is a continuation of copending application Ser. No. 611,906, filed Jan. 26, 1967 and now abandoned.

SUMMARY OF THE INVENTION

One of the difficulties noted in air valve carburetors has been the tendency of the air valve to hunt or oscillate during operation, thereby producing uneven fuel-metering signals and uneven fuel-air mixtures. Such oscillations must be dampened without interfering unduly with the normal air valve response.

This invention provides a rotary damper for an air valve mounted in the induction passage of the body of an air valve carburetor. The damper comprises a housing attached to the carburetor body and containing a fluid medium. A rotor attached to the shaft of the air valve is located rotatably in the housing in contact with the fluid medium.

With circularly uniform constructions of the rotor and the inner surface of the housing, damping is uniform regardless of the position of the air valve. Raised lands can be provided on both the rotor and the inner surface of the housing to increase the amount of damping at predetermined openings of the air valve. The rotor preferably is cup shaped to produce a high ratio of rotor surface area to overall housing size.

DETAILED DESCRIPTION OF THE DRAWINGS

Figure 1:
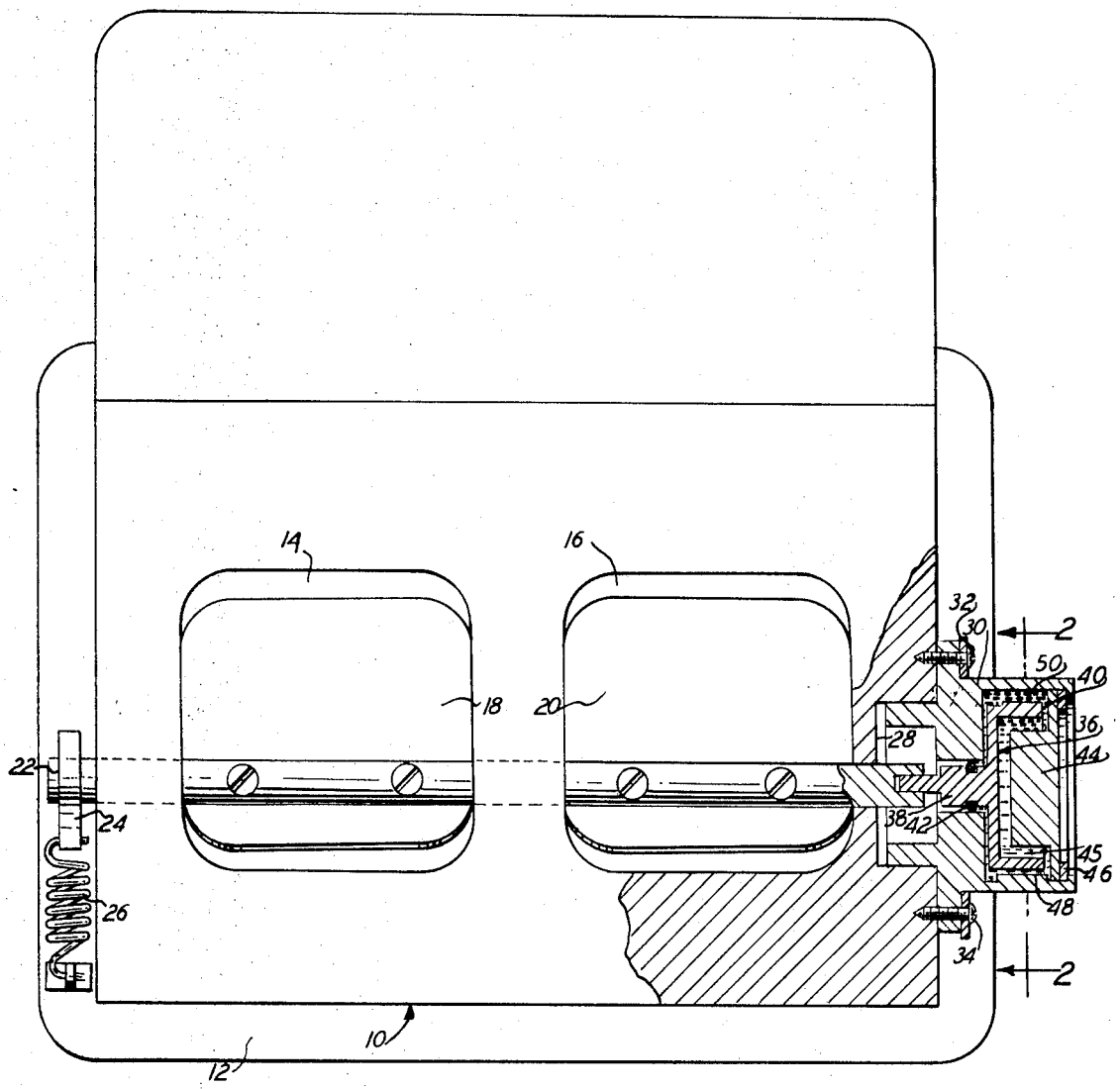
FIG. 1 of the drawings shows a top view of a two-venturi air valve carburetor with parts of the carburetor body and the housing of the damping device broken away.

In FIG. 1 the carburetor body is represented generally by the numeral 10. Body 10 has a flange 12 at its lower end that fastens to an engine intake manifold (not shown) in a conventional manner. Two induction passages 14 and 16 pass vertically through body 10 and align with passages in the intake manifold. Conventional throttle valves (not shown) are located in passages 14 and 16. The operating hardware for these throttle valves has been removed from the drawing for simplicity. Air valves 18 and 20 are supported in induction passages 14 and 16, respectively, anterior to the throttle valves by a shaft 22 pivoting in carburetor body 10.

A lever arm 24 is attached to one end of shaft 22 outside of body 10. A spring 26 attaches to arm 24 and is anchored to flange 12. Spring 16 and arm 24 counteract the forces opening air valves 18 and 20 so a constant vacuum is maintained between air valves 18 and 20 and the corresponding throttle valves in accordance with the principles of air valve carburetors.

The other end of shaft 22 extends into a cavity 28 formed in the wall of body 10. A damper housing 30 locates in cavity 28 and is fastened to body 10 by conventional threaded fasteners 32 and 34. A cup-shaped rotor 36 having a hub portion 38 and a vane portion 40 is located in housing 30 so hub portion 38 projects through an appropriate opening where it is engaged by shaft 22. An O-ring 42 seals the surface between hub portion 38 and housing 30.

A cover 44 having an inner portion conforming to the shape of the inner surface of vane portion 40 closes and seals the outboard end of housing 30. A snap ring 46 holds cover 44 in place. Space exists between vane portion 40 and housing 30 and cover 44, and this space is filled with a viscous fluid medium 45 such as a silicone or petroleum oil prior to installation of cover 44.

In operation, fluid medium 45 dampens any oscillations or hunting of air valves 18 and 20. The amount of dampening can be varied by decreasing or increasing the clearance between rotor 36, cover 44, and housing 30, by changing the viscosity of the fluid medium or by changing the surface roughness of the internal surface of housing 30, vane portion 40, or cover 44.

Figure 2:
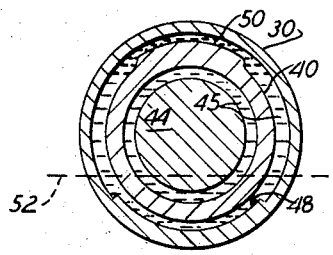
FIG. 2 is a section of the damping device taken along line 2–2 of FIG. 1, showing more clearly the lands providing variable damping.

With circular constructions of the internal surface of housing 30, vane 40 and cover 44, the damping provided by the device of this invention is uniform throughout the sweep of air valves 18 and 20. For some air valve carburetors, this uniform damping is desirable. However, it may be desirable to increase the amount of damping at higher or lower openings of air valves 18 and 20. The structure shown in FIG. 2 accomplishes this by having lands 48 and 50 at appropriate places of housing 30 and vane portion 40, respectively. A smaller clearance exists between lands 48 and 50 when they are adjacent each other. The amount of damping provided by the damping device when land 50 is adjacent land 48 is greater than when land 50 is in the larger portions of the space within housing 30.

Lands 48 and 50 can be located so the increased damping takes place at any desired position of air valves 18 and 20. A greater variation in the amount of damping can be achieved by filling the space in housing 30 with fluid medium 45 partially only, to line 52 in FIG. 2 for example. Damping force is provided only by the portion of rotor 40 submerged in fluid medium 45 and is much greater when land 50 is submerged in fluid medium 45 adjacent land 48 than when land 50 is above line 52.

Thus, this invention provides a compact, easily designed and easily constructed damping device for preventing oscillation or hunting of the air valves in an air valve carburetor. Embodiments of the invention producing constant damping at all positions of the air valves as well as embodiments producing variable damping are provided.

We claim:

1. In an air valve carburetor having a carburetor body with an induction passage therein and an air valve mounted on a shaft in said induction passage, a damping device comprising:
    a housing attached to said carburetor body, said housing containing a fluid medium and having at least one land means on a surface in contact with said fluid medium; and
    a rotor attached to said shaft and positioned rotatably in said housing, said rotor being in contact with said fluid medium and having at least one land means located on the surface facing the land means on the housing, each of said land means on the housing and the rotor having a significant surface area said air valve rotating said rotor from a position in which said land means are adjacent each other to a position in which said land means are removed from each other, said land means and said fluid medium providing said rotor with an increased amount of damping when said land means are adjacent each other.

2. The carburetor of claim 1 in which the rotational axis of the rotor is substantially horizontal, the housing is filled only partially with the fluid medium and the land means of the housing is submerged in the fluid medium, said air valve rotating said land means of the rotor out of said fluid for a reduced amount of damping and into said fluid and adjacent the land means on the housing for an increased amount of damping.